US012752473B2

(12) United States Patent
Hidaka et al.

(10) Patent No.: US 12,752,473 B2
(45) Date of Patent: Oct. 6, 2026

(54) RESIN MOLDED PRODUCT INFORMATION MANAGEMENT METHOD, METHOD FOR PRODUCING RESIN CONTAINER, RESIN MOLDED PRODUCT INFORMATION MANAGEMENT DEVICE, AND BLOW MOLDING DEVICE

(71) Applicant: NISSEI ASB MACHINE CO., LTD., Nagano (JP)

(72) Inventors: Yasuhiro Hidaka, Nagano (JP); Hiroki Ogihara, Nagano (JP); Mikako Takeuchi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 104 days.

(21) Appl. No.: 18/016,377

(22) PCT Filed: Jul. 16, 2021

(86) PCT No.: PCT/JP2021/026890
§ 371 (c)(1),
(2) Date: Jan. 16, 2023

(87) PCT Pub. No.: WO2022/014715
PCT Pub. Date: Jan. 20, 2022

(65) Prior Publication Data

US 2023/0278276 A1 Sep. 7, 2023

(30) Foreign Application Priority Data

Jul. 17, 2020 (JP) ................................. 2020-123155

(51) Int. Cl.
*B29C 49/78* (2006.01)
*B29C 49/02* (2006.01)
(Continued)

(52) U.S. Cl.
CPC .......... *B29C 49/786* (2013.01); *B29C 49/064* (2013.01); *B29C 49/42065* (2022.05);
(Continued)

(58) Field of Classification Search
CPC ......... B29C 49/78; B29C 49/06; B29C 49/42; B29C 49/68; B29C 49/786; B29C 49/064;
(Continued)

(56) References Cited

U.S. PATENT DOCUMENTS 9,623,600 B2 * 4/2017 Seger .................... B65G 35/00
2008/0078827 A1 4/2008 Geiss
(Continued)

FOREIGN PATENT DOCUMENTS

JP 6-198726 A 7/1994
JP 6-344426 A 12/1994
(Continued)

OTHER PUBLICATIONS

JPH06344426 English translation prepared Sep. 10, 2024 (Year: 2024).*
(Continued)

*Primary Examiner* — Emmanuel S Luk
*Assistant Examiner* — Shibin Liang
(74) *Attorney, Agent, or Firm* — Greenblum & Bernstein, P.L.C.

(57) ABSTRACT

This information management method for a resin molded product in a molding device for intermittently producing resin molded products includes: classifying the resin molded products into molded product groups for each molding cycle; acquiring an information group for each of the molded product groups; and recording the acquired information groups in association with the molded product groups.

6 Claims, 9 Drawing Sheets

(51) Int. Cl.
*B29C 49/06* (2006.01)
*B29C 49/12* (2006.01)
*B29C 49/42* (2006.01)
*B29C 49/68* (2006.01)

(52) U.S. Cl.
CPC ........ *B29C 49/42069* (2022.05); *B29C 49/68* (2013.01); *B29C 2049/023* (2013.01); *B29C 49/12* (2013.01); *B29C 2049/7867* (2022.05); *B29C 2049/78675* (2022.05); *B29C 2049/7882* (2022.05); *B29C 2949/0715* (2022.05)

(58) Field of Classification Search
CPC ........ B29C 49/42065; B29C 49/42069; B29C 2049/023; B29C 49/30
See application file for complete search history.

(56) References Cited

U.S. PATENT DOCUMENTS

| | | | | |
|---|---|---|---|---|
| 2014/0271976 | A1* | 9/2014 | Yamaguchi | ....... B29C 49/42122 425/534 |
| 2016/0031146 | A1 | 2/2016 | Yamaguchi | |
| 2016/0082504 | A1* | 3/2016 | Okochi | ................. G06F 3/0482 425/162 |
| 2021/0268714 | A1 | 9/2021 | Sakabe | |
| 2022/0040900 | A1 | 2/2022 | Hidaka | |

FOREIGN PATENT DOCUMENTS

| | | | | |
|---|---|---|---|---|
| JP | H06344426 | * | 12/1994 | ............. B29C 49/06 |
| JP | 2000-127236 | A | 5/2000 | |
| JP | 2013-99941 | A | 5/2013 | |
| WO | 2019152365 | * | 8/2019 | ............. B29C 45/76 |
| WO | 2020/004441 | A1 | 2/2020 | |
| WO | 2020/066749 | A1 | 4/2020 | |

OTHER PUBLICATIONS

Supplementary European Search Report dated Jul. 8, 2024 in European family member application No. 21 84 3018.9.
International Search Report issued in International Bureau of WIPO Patent Application No. PCT/JP2021/026890, dated Aug. 31, 2021, along with an English translation thereof.
Written Opinion issued in International Bureau of WIPO Patent Application No. PCT/JP2021/026890, dated Aug. 31, 2021 and English translation thereof.

* cited by examiner

FIG. 6

Preform information Preform diameter 35.0 mm

| ID Shot Row | Station No. | Perform exist | Before reheating | Floating | After reheating | Blow temperature | Preform counter | Preform transfer | Intermittency Preform exist | Cooling Block |
|---|---|---|---|---|---|---|---|---|---|---|
| 0.0 | 19 | OK | 77.7 ℃ | OK | 114.8 ℃ | OK | 12 | OK | OK | 0 |
| 0.1 | 18 | OK | 78.2 ℃ | OK | 115.0 ℃ | OK | 12 | OK | OK | 0 |
| 0.2 | 16 | OK | 78.7 ℃ | OK | 115.2 ℃ | OK | 12 | OK | OK | 0 |
| 1.0 | 15 | OK | 78.0 ℃ | OK | 115.0 ℃ | OK | 12 | OK | OK | 1 |
| 1.1 | 14 | OK | 78.5 ℃ | OK | 115.2 ℃ | OK | 11 | NG | OK | 1 |
| 1.2 | 13 | OK | 79.0 ℃ | OK | 99.0 ℃ | NG | 12 | NG | OK | 1 |
| 2.0 | 12 | OK | 77.3 ℃ | OK | | | | | OK | 0 |
| 2.1 | 11 | OK | 77.8 ℃ | OK | | | | | OK | 0 |
| 2.2 | 10 | OK | 78.3 ℃ | NG | | | | | OK | 0 |
| 3.0 | 9 | OK | 77.8 ℃ | OK | | | | | OK | 1 |
| 3.1 | 8 | OK | 78.3 ℃ | OK | | | | | OK | 1 |
| 3.2 | 7 | OK | 78.5 ℃ | OK | | | | | OK | 1 |
| 4.0 | 6 | NG | | | | | | | NG | 0 |
| 4.1 | 5 | NG | | | | | | | NG | 0 |
| 4.2 | 3 | NG | | | | | | | NG | 0 |
| 5.0 | 2 | | | | | | | | | |
| 5.1 | 1 | | | | | | | | | |
| 5.2 | 0 | | | | | | | | | |

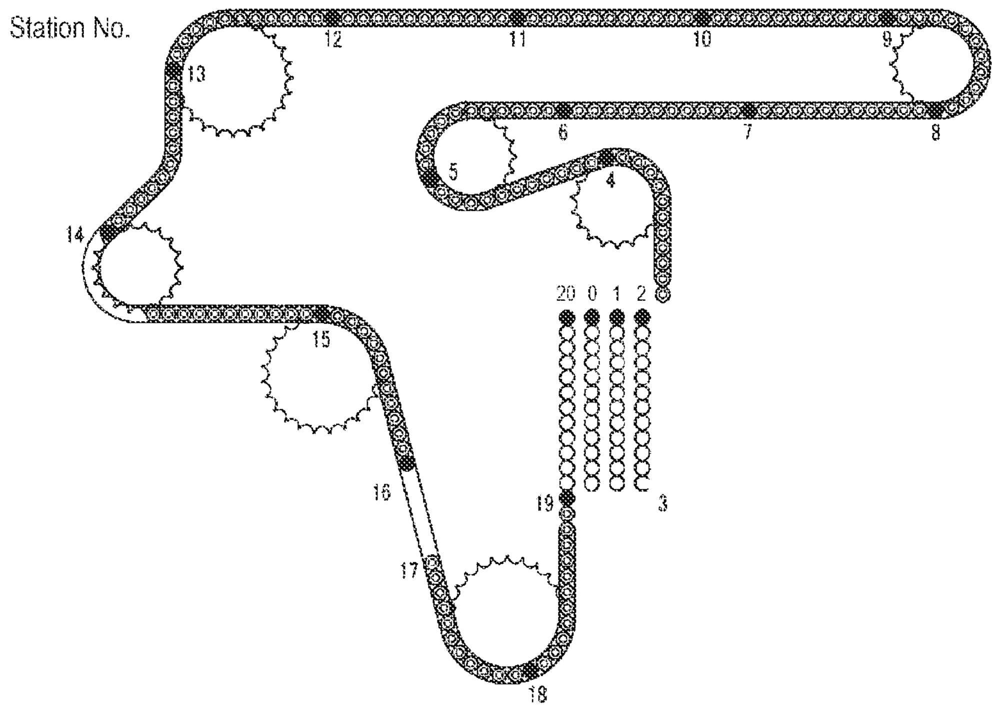

(CONT.)

(FIG. 8 CONTINUED)
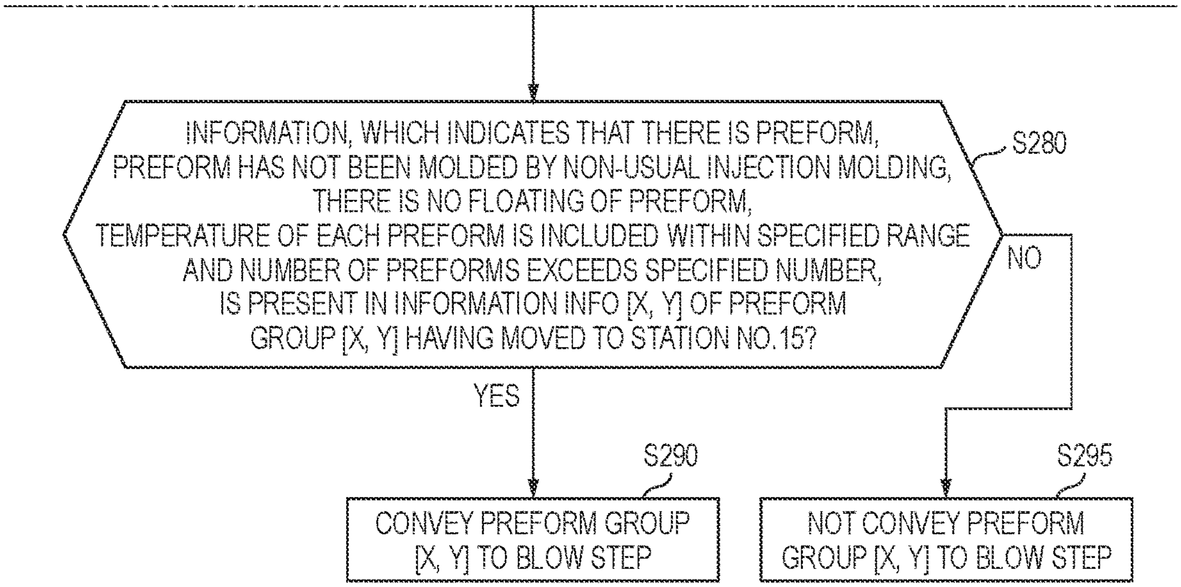

RESIN MOLDED PRODUCT INFORMATION MANAGEMENT METHOD, METHOD FOR PRODUCING RESIN CONTAINER, RESIN MOLDED PRODUCT INFORMATION MANAGEMENT DEVICE, AND BLOW MOLDING DEVICE

TECHNICAL FIELD

The present invention relates to an information management method for a resin molded product, a manufacturing method of a resin container, an information management device for a resin molded product, and a blow molding apparatus.

BACKGROUND ART

Patent Literature 1 discloses a blow molding machine of a resin container including at least a blow molding part, a heating unit, and a conveyance path for conveying a preform heated in the heating unit to the blow molding part. Patent Literature 2 discloses an injection blow molding apparatus including a control unit configured to execute and control one-cycle operation in each operation unit in accordance with a usual operation program and an end program for stopping an operation of an apparatus in the event of detecting an abnormality, and abnormality detection sensors each provided for each operation unit and used for execution of the end program.

CITATION LIST

Patent Literature

Patent Literature 1: WO2020/066749
Patent Literature 2: JP2000-127236A

SUMMARY OF INVENTION

Technical Problem

In recent years, a molding method capable of favorably manufacturing a resin preform or a resin container even when an injection molding time is shortened is suggested, so that additional high-speed molding (high cycle molding) can be implemented in an injection molding apparatus or a blow molding apparatus. Under high-speed molding, since a movable part of the molding apparatus is also driven at high speed, it is necessary to operate the movable part more precisely. If the molding apparatus is stopped due to malfunction or breakage of the movable part, resin molded products deviate from a proper molding condition, and therefore, are all discarded. Therefore, there is a need for improvements so that a mechanical operation and a molding process of the molding apparatus can be stabilized even under high-speed molding.

The present invention is to provide an information management method for a resin molded product, a manufacturing method of a resin container, an information management device for a resin molded product, and a blow molding apparatus capable of improving stability of a mechanical operation and a molding process of a molding apparatus by classifying and managing information about resin molded products.

Solution to Problem

An information management method for a resin molded product according to one aspect of the present invention is an information management method for a resin molded product in a molding apparatus configured to intermittently manufacture resin molded products. The information management method includes a step of classifying the resin molded products into molded product groups for each molding cycle, a step of acquiring an information group for each molded product group, and a step of recording the acquired information groups in association with the molded product groups.

An information management device for a resin molded product according to one aspect of the present invention is an information management device for a resin container in a molding apparatus configured to intermittently manufacture resin molded products. The information management device includes a classification unit configured to classify the resin molded products into molded product groups for each molding cycle, an acquisition unit configured to acquire an information group for each molded product group, and an information group recording unit configured to record the information groups acquired by the acquisition unit, in association with the molded product groups.

Advantageous Effects of Invention

According to the present invention, it is possible to provide the information management method for a resin molded product, the manufacturing method of a resin container, the information management device for a resin molded product, and the blow molding apparatus capable of improving stability of a mechanical operation and a molding process of a molding apparatus by classifying and managing information about resin molded products.

BRIEF DESCRIPTION OF DRAWINGS

FIG. 6 shows an example of an aspect in which a display unit displays elements relating to an information group of a preform group.

DESCRIPTION OF EMBODIMENTS

Figure 1:
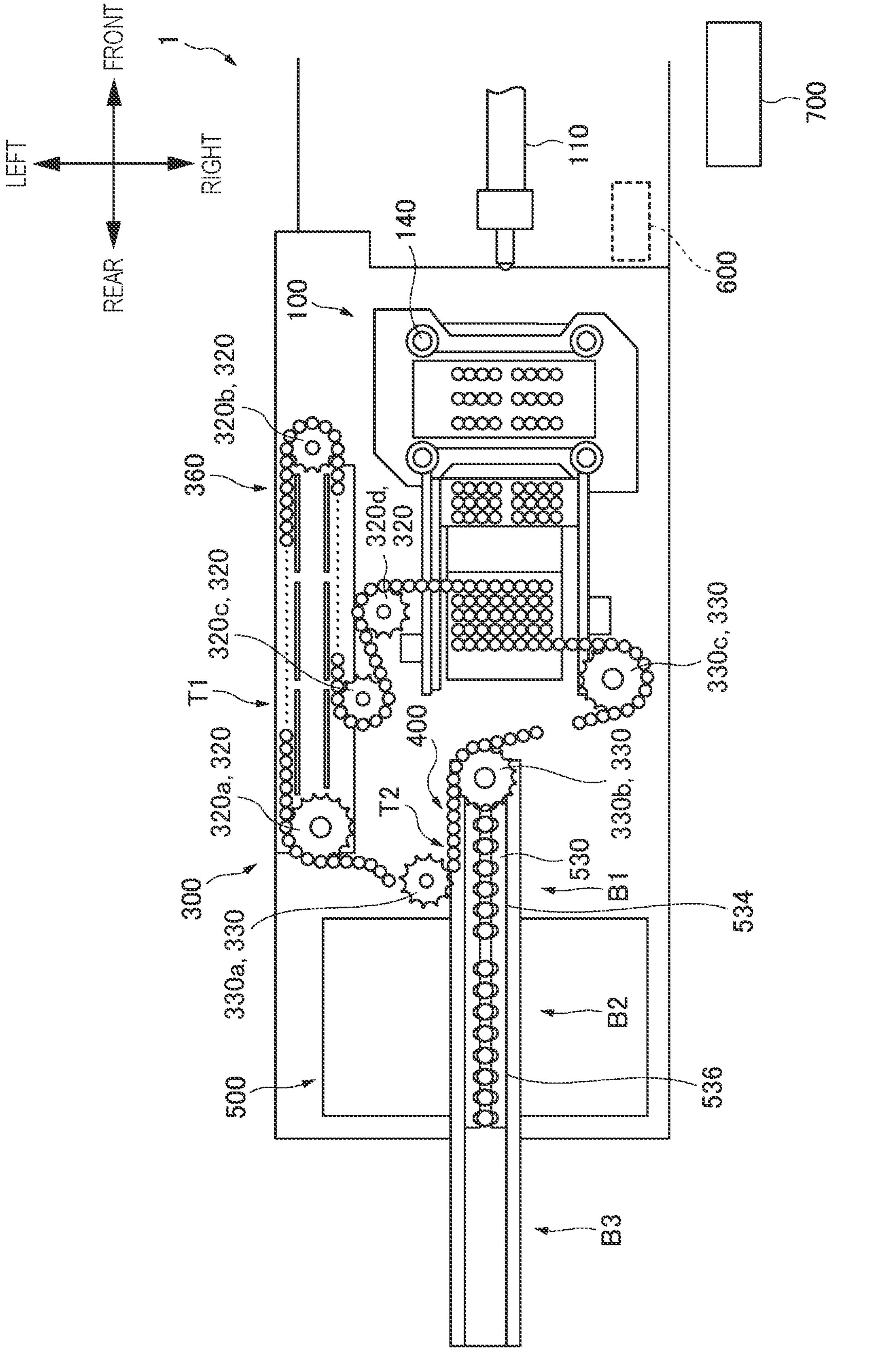
FIG. 1 is a schematic plan view of a blow molding apparatus.

Hereinafter, an embodiment of the present invention will be described with reference to the drawings. Note that, for convenience of description, the dimension of each member shown in the drawings may be different from the dimension of each actual member.

In addition, in the description of the present embodiment, for convenience of description, “left and right direction”, “front and rear direction”, and “upper and lower direction” are appropriately referred to. These directions are relative directions set with respect to the blow molding apparatus shown in FIGS. 1 and 2. Here, “upper and lower direction” is a direction including “upper direction” and “lower direction”. “Front and rear direction” is a direction including "front direction" and "rear direction". The "left and right direction" is a direction including "left direction" and "right direction".

Figure 2:
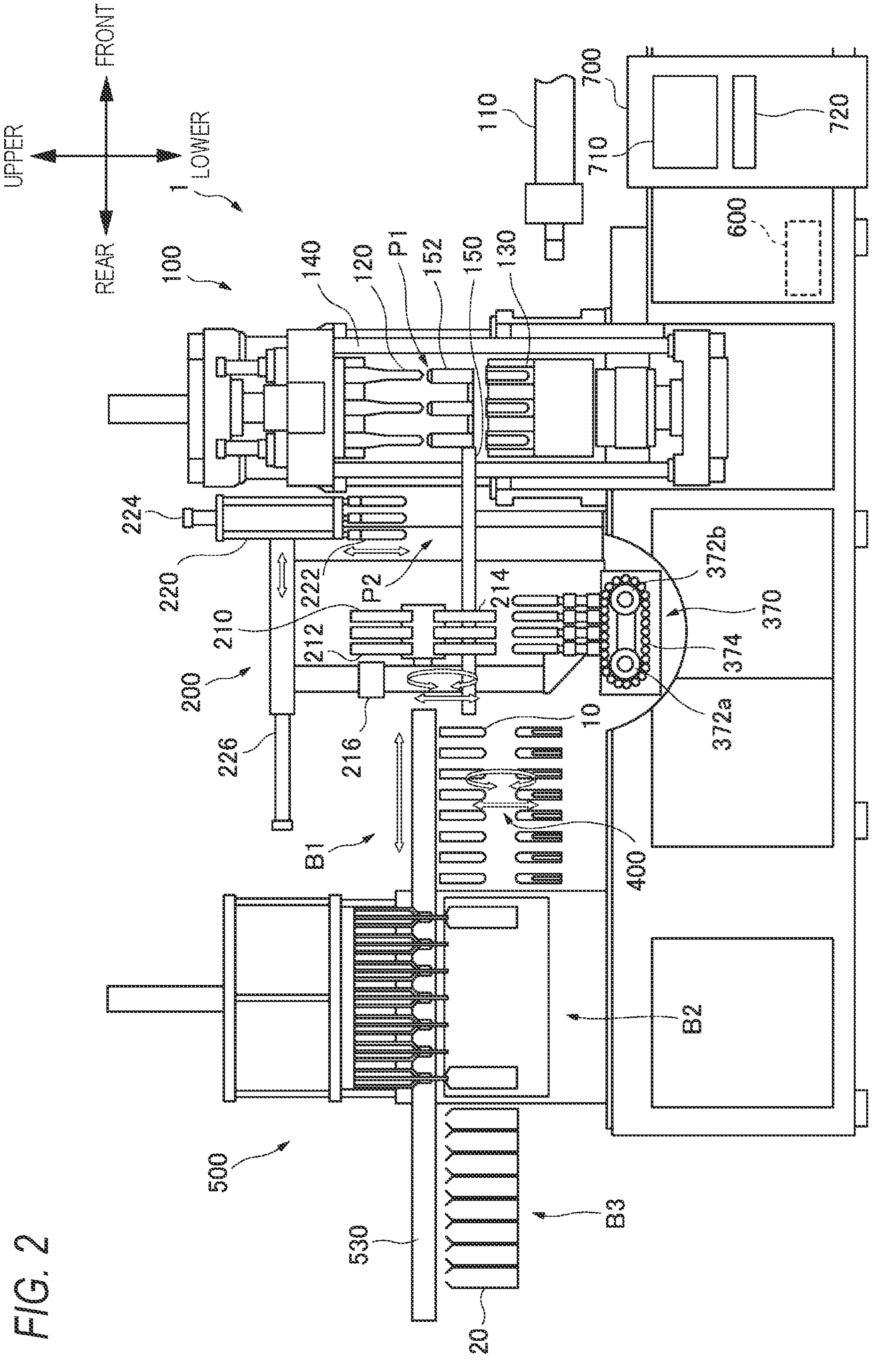
FIG. 2 is a schematic side view of the blow molding apparatus.

FIG. 1 is a schematic plan view showing an overall aspect of a blow molding apparatus 1 of a resin container according to an embodiment. FIG. 2 is a schematic side view showing the overall aspect of the blow molding apparatus 1 according to the embodiment. The blow molding apparatus 1 includes an injection molding part 100 configured to mold a resin preform 10, a blow molding part 500 configured to mold a container 20 by blow-molding the preform 10, and a conveyance part 300 configured to convey the preform 10 molded in the injection molding part 100 to the blow molding part 500 (FIG. 1). The blow molding apparatus 1 is a hot parison-type (1.5 stage-type) blow molding apparatus in which N preforms simultaneously injection-molded are blow-molded by M inn times.

The blow molding apparatus 1 includes a take-out device 150 configured to take out the preform 10 from the injection molding part 100, a preform transfer device 220 configured to transfer the preform 10 from the take-out device 150, and a first reversing part (post-cooling part) 200 configured to deliver the preform 10 from the preform transfer device 220 to the conveyance part 300 (FIG. 2). In addition, the blow molding apparatus 1 includes a second reversing part 400 configured to deliver the preform 10 from the conveyance part 300 to the blow molding part 500 (FIG. 2). Further, the blow molding apparatus 1 includes an information management device 600 for a preform (an example of a resin molded product) and an input/output device 700 (FIGS. 1 and 2).

The injection molding part 100 is configured to injection-mold N preforms 10 simultaneously by M (M=N/n: M is a natural number) in each of n rows (n is an integer of two or greater) parallel to the left and right direction. The injection molding part 100 includes an injection device 110 configured to inject resin, an injection core mold 120, an injection neck mold (not shown), an injection cavity mold 130, and a mold clamping mechanism configured to drive clamping of molds along four tie bars 140. As shown in FIG. 1, the maximum number N of the preforms that are simultaneously injection-molded in the injection molding part 100 may be, for example, 24 (3 rows×8 preforms). When a diameter of the preform is large, 4 preforms may be arrayed in each row, and therefore, the total number N is 12 in 3 rows. In addition, the maximum number N of the preforms that are simultaneously injection-molded in the injection molding part 100 may be, for example, 36 (3 rows×12 preforms) (refer to FIGS. 5 and 6).

The take-out device 150 is configured to take out the N preforms 10 molded in the injection molding part 100. The take-out device 150 is configured to be able to horizontally move N (for example, 3 rows×8) holding members 152 (for example, pots) at a receiving position P1 below the injection core mold 120 and at a delivery position P2 outside a space surrounded by the tie bars 140.

The preform transfer device 220 is configured to transfer the N preforms 10 held in the holding members 152 in three rows of the take-out device 150 located at the delivery position P2 shown in FIG. 2 to the first reversing part 200. The preform transfer device 220 includes a preform holder 222, a first transfer mechanism 224 configured to move the preform holder 222 up and down in the upper and lower direction, and a second transfer mechanism 224 configured to horizontally move the preform holder 222 and the first transfer mechanism 224 in the front and rear direction. As a drive source for the first and second transfer mechanisms 224 and 226, an air cylinder or a servomotor is used, for example.

The first reversing part 200 is a part for post-cooling (additionally cooling) the preform 10, and is configured to reverse the preform 10 in an upright state molded in the injection molding part 100 to an inverted state with a neck portion facing downward, and to deliver the same to the conveyance part 300. The first reversing part 200 includes a first reversing member 210. The first reversing member 210 has N first reversing pots 212 and N second reversing pots 214 provided to face the first reversing pots 212. The first reversing pot 212 and the second reversing pot 214 (first reversing member 210) are configured to be intermittently reversible by 180° around an axis. The first reversing member 210 is configured to be able to move up and down by a ball screw or the like that is driven by a drive source 216 (for example, a servomotor). The first reversing pot 212 and the second reversing pot 214 are configured to cool the preform 10 accommodated therein.

Figure 3:
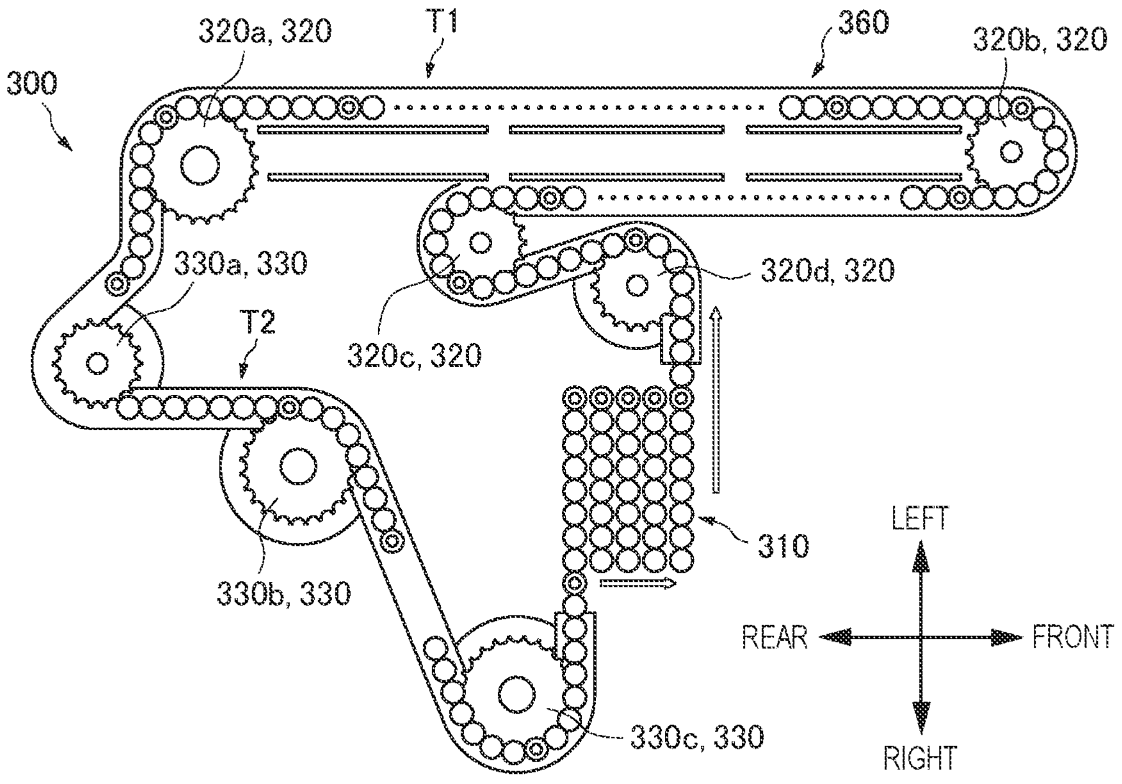
FIG. 3 is a plan view of a conveyance part.

The conveyance part 300 is configured to convey, to the blow molding part 500, the preform 10 conveyed from the injection molding part 100 to the conveyance part 300 via the first reversing part 200. FIG. 3 is a plan view showing an aspect of the conveyance part 300. The conveyance part 300 includes a plurality of first conveyance members 310 configured to support the preforms 10. The M first conveyance members 310 are connected by a connecting member to form one set of the first conveyance members 310. The connecting member of one set of the first conveyance members 310 is configured to be driven by a first conveyance driving unit 320 and a second conveyance driving unit 330, which will be described later. In FIG. 3, a position of the leading first conveyance member 310 (or the preform 10) of one set of the first conveyance members 310 is marked with a double circle so as to distinguish the same with the other seven ones other than the leading one. Each of the first conveyance members 310 is configured to be rotatable around an axis. Note that, an aspect in which the first conveyance members 310 are not connected is also possible. In this case, each of the first conveyance members 310 is provided with a member that engages with a continuous/intermittent drive member such as a sprocket.

The conveyance part 300 has a loop-shaped conveyance path composed of a guide rail or the like, and is configured to convey the first conveyance members 310 in a circulation manner along the conveyance path. The conveyance part 300 includes a plurality of sprockets 320*a*, 320*b*, 320*c* and 320*d* serving as a first conveyance driving unit 320 configured to continuously drive the first conveyance members 310, and sprockets 330*a*, 330*b* and 330*c* serving as a second conveyance driving unit 330 configured to intermittently drive the first conveyance members 310. In the first conveyance driving unit 320, the sprocket 320*d*, the sprocket 320*c*, the sprocket 320*b*, and the sprocket 320*a* are arranged in corresponding order from an upstream side. In the second conveyance driving unit 330, the sprocket 330*a*, the sprocket 330*b*, and the sprocket 330*c* are arranged in corresponding order from the upstream side.

A region in which the first conveyance members 310 are continuously driven by the first conveyance driving unit 320 is a continuous conveyance region T1, and a region in which the first conveyance members 310 are intermittently driven by the second conveyance driving unit 330 is an intermittent conveyance region T2. The continuous conveyance region T1 is located on a further upstream side of the conveyance part 300 than the intermittent conveyance region T2. A heating unit 360 configured to heat a temperature of the preform 10 to a temperature suitable for blow molding is provided in the continuous conveyance region T1. The heating unit 360 is arranged on a path spanning the sprocket 320*c*, the sprocket 320*b*, and the sprocket 320*a* in the continuous conveyance region T1. The heating unit 360 may be configured by arranging heaters, for example, quartz heaters and reflectors arranged at intervals in a conveyance direction and in multiple stages in a height direction (upper and lower direction), on both sides of the conveyance part 300 in the continuous conveyance region T1. Inside the heating unit 360, wind may be blown from a back side of the heater.

In addition, the conveyance part 300 includes a parallel driving device 370 arranged at a position below the first reversing part 200 and configured to drive one set of (n+1) or more (for example, four (four rows)) first conveyance members 310 in parallel (FIG. 2). The parallel driving device 370 is configured by attaching both ends of a plurality of conveying rails to two chains 374 spanning two sprockets 372*a* and 372*b* at end portions in the front and rear direction. When one of the sprockets 372*a* and 372*b* is rotated by one step, the conveyance rails are transferred by one step. The leading row of one set of the first conveyance members 310 arranged in the parallel driving device 370 is configured to be pushed out leftward by a carry-out device (not shown) including, for example, an air cylinder or the like. Thereby, one set of the first conveyance members 310 on which the preforms 10 are placed are continuously conveyed by being sequentially engaged with the sprocket 320*d* that is continuously driven. The parallel driving device 370 is configured to transfer another set of first conveyance members 310 forward by one step after conveying one set of the first conveyance members 310 leftward. The rearmost row of the parallel driving device 370 is configured to receive one set of the first conveyance members 310 on which the preforms 10 delivered from the sprocket 330*c* are not placed.

The leading first conveyance member 310 of the leading row of one set of the first conveyance members 310 is carried out by the carry-out device and engaged with the most upstream sprocket 320*d*, so that a continuous conveyance force is applied from the sprocket 320*d* to one set of the first conveyance members 310. When a drive force is applied to each set of first conveyance members 310 that engage with the four continuously driven sprockets 320*a*, 320*b*, 320*c* and 320*d* existing in the continuous conveyance region T1, another set of the first conveyance members 310 that do not engage with the continuously driven sprocket on the upstream side thereof are pushed, and therefore, the plurality of sets of first conveyance members 310 are continuously conveyed along the conveyance direction in the continuous conveyance region T1.

The second reversing part 400 is arranged between the sprocket 330*a* and the sprocket 330*b* in the intermittent conveyance region T2 of the conveyance part 300 (FIGS. 1 and 2). The second reversing part 400 includes a second reversing member (not shown) configured to reverse the preform 10 conveyed to the position of the second reversing part 400 by the conveyance part 300 from an inverted state to an upright state. One set of the first conveyance members 310 are intermittently driven by the second conveyance driving unit 330 so that one set of the first conveyance members 310 are stopped for a predetermined time at the position of the second reversing part 400.

The blow molding part 500 is configured to mold the resin containers 20 by stretching M preforms 10 with blowing air. The blow molding part 500 includes a blow cavity mold that is a split mold, is openable and closable in the left and right direction and defines a shape of a body portion of the container 20, a liftable bottom mold that defines a bottom portion of the container 20, and a second conveyance member 530 for conveying the preform 10 and the container 20 in the front and rear direction. In addition to these, the blow molding part 500 may include a stretch rod, a blow core mold, a neck mold, and the like. In the case of having a stretch rod, the resin container 20 is molded by biaxially stretching the preform by using a blowing air and a vertical-axis driving of the stretch rod.

The second conveyance member 530 is a chuck member configured to grip neck portions of M preforms 10 or containers 20 and to convey the same intermittently. The second conveyance member 530 includes holding arms configured to grip the neck portions of the preforms 10 or containers 20. The second conveyance member 530 integrally includes a carry-in unit 534 and a carry-out unit 536, and is configured to reciprocally drive in the front and rear direction. The reciprocating drive is realized by, for example, a servomotor. The reciprocating drive reciprocates the carry-in unit 534 between a preform receiving position B1 and a blow molding position B2 and reciprocates the carry-out unit 536 between the blow molding position B2 and a take-out position B3. The holding arms are configured to be integrally driven to be opened and closed in the left and right direction by a drive force of an air cylinder, for example. In addition, a row pitch (distance between the respective preforms) of the respective holding arms of the carry-in unit 534 is configured to be changeable from a narrow pitch at the preform receiving position B1 to a wide pitch at the blow molding position B2 when moving from the preform receiving position B1 to the blow molding position B2.

Figure 4:
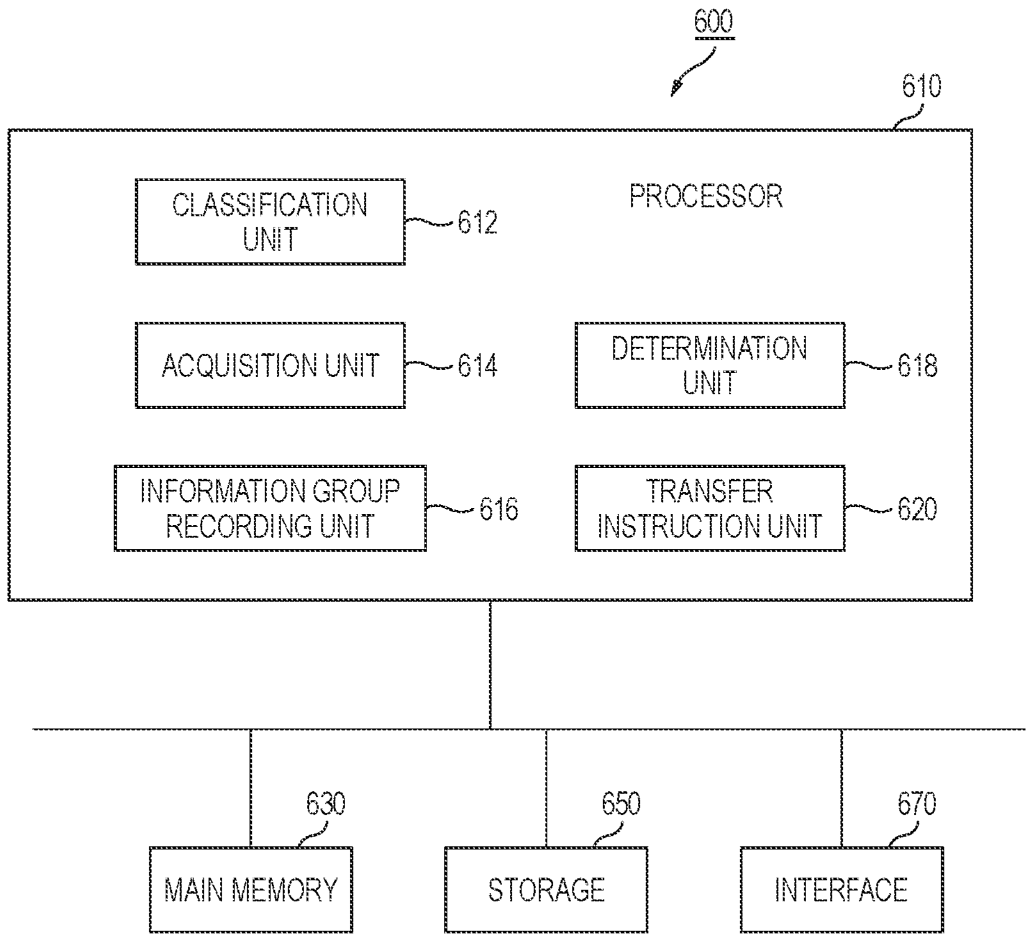
FIG. 4 is a block diagram of an information management device.

The information management device 600 is a device configured to manage elements relating to the preform 10. FIG. 4 is a block diagram showing a configuration of the information management device 600 according to the present embodiment. The information management device 600 includes a processor 610, a main memory 630, a storage 650, and an interface 670. A program for managing information about the preform 1 of the blow molding apparatus 1 is stored in the storage 650. Examples of the storage 650 include a hard disk drive (HDD), a solid state drive (SSD), a non-volatile memory, and the like. The processor 610 is configured to read a program from the storage 650, to develop the same into the main memory 630, and to execute processing in accordance with the program. In addition, the processor 610 is configured to secure a storage area in the main memory 630 or the storage 650 in according with the program. The processor 610 is configured to function as a classification unit 612, an acquisition unit 614, an information group recording unit 616, a determination unit 618, and a transfer instruction unit 620 by executing the program. These functional units may also be collectively referred to as a control unit.

The classification unit 612 is configured to classify the preforms 10 into preform groups (an example of molded product groups) for each injection molding cycle. Specifically, the classification unit 612 is configured to classify the preforms molded in the injection molding part 100 into molded product groups for each injection molding cycle (group of N preforms) and for each blow molding cycle (group of M preforms) among preforms molded in one injection molding cycle. In other words, the classification unit 612 is configured to classify the preform group with a relationship of variables [x, y], based on a batch number x of the injection molding and a row number y in the batch number x. In addition, the classification unit 612 is configured to assign a position (Station No.') of each preform group in the blow molding apparatus to the preform group classified with the relationship of the variables [x, y].

The acquisition unit 614 is configured to acquire an information group for each preform group. The information group includes at least information about a current position of the preform group in the blow molding apparatus and a molded product state. In addition, the information group may include at least information about an injection molding cycle number (variable x), a blow molding cycle number (variable y) in the injection molding cycle number, a current position of the preform group in the blow molding apparatus, and a molded product state. The information about the molded product state includes at least information as to whether the preform 10 is on the first conveyance member 310, as to whether the preform has been molded by non-usual injection molding, as to which of the first reversing pot 212 and the second reversing pot 214 the preform 10 has passed through (an example of the information about the cooling member that the preform 10 has passed through), about a temperature of the preform 10 before heating in the heating unit 360, about a temperature of the preform 10 after heating in the heating unit 360, about a posture of the preform 10 placed on the first conveyance member 310, and about the number of the preforms 10 placed on the first conveyance members 310.

Here, "non-usual injection molding" (also referred to as "intermittent injection molding") means injection molding of a preform for partially maintaining an operating state of the blow molding apparatus 1. "Non-usual injection molding" is an operation for reducing waste of preforms by reducing the number of times of injection molding of the preforms 10 to partially maintain an operating state during a usual operation, when partially maintaining operations of the injection molding part 100, the conveyance part 300, and/or the heating unit 360 during a maintenance operation of the blow molding part 500, for example. In order to mass-produce containers without molding defects, it is necessary to maintain the heating unit 360 within a predetermined temperature range so that the preform 10 can be heated to a constant temperature all the time. If the operation of the heating unit 360 is stopped, since it takes a considerable time to restore the temperature within a predetermined temperature range and it is necessary to perform readjustment in consideration of an amount of heat to be lost to the preform 10, the heating unit 360 needs to keep operating. In addition, since molten resin in the injection device 110 is deteriorated by the heat of the barrel heater, the molten resin should be discharged periodically. However, in this case, since it is necessary to continuously mold the preform 10, which is not blow-molded, the function of the non-usual injection molding described above becomes effective.

On the other hand, injection molding during a usual operation (automatic operation for a long time (for example, 1 hour or longer) that is performed after molding adjustment) corresponds to "usual injection molding". However, the embodiment will be described according to injection molding during the usual operation, unless otherwise specified. In addition, in the blow molding apparatus 1 including the injection molding part 100, the non-usual injection molding may also be referred to as a preform molding operation without being accompanied by blow molding, and the usual injection molding may also be referred to as a preform molding operation accompanied by blow molding. Note that, the non-usual injection molding is performed once for several cycle times of the usual injection molding or after a predetermined time equal to or longer than the molding cycle time of the usual injection molding elapses (for example, 60 seconds).

The injection molding cycle number (variable x) and the blow molding cycle number (variable y) in the injection molding cycle number are information that is output from the classification unit 612. The current position of the preform group in the blow molding apparatus is information that is output from the classification unit 612. Whether the preform is on the first conveyance member 310, whether the preform 10 has been molded by non-usual injection molding, and which of the first reversing pot 212 and the second reversing pot 214 the preform 10 has passed through are information that is set to be automatically output at the time when the preform is conveyed onto the first conveyance member 310. The temperature of the preform 10 before heating in the heating unit 360, the temperature of the preform 10 after heating in the heating unit 360, the posture of the preform 10, and the number of the preforms 10 are an information group that is detected by sensors arranged in the blow molding apparatus 1.

Figure 5:
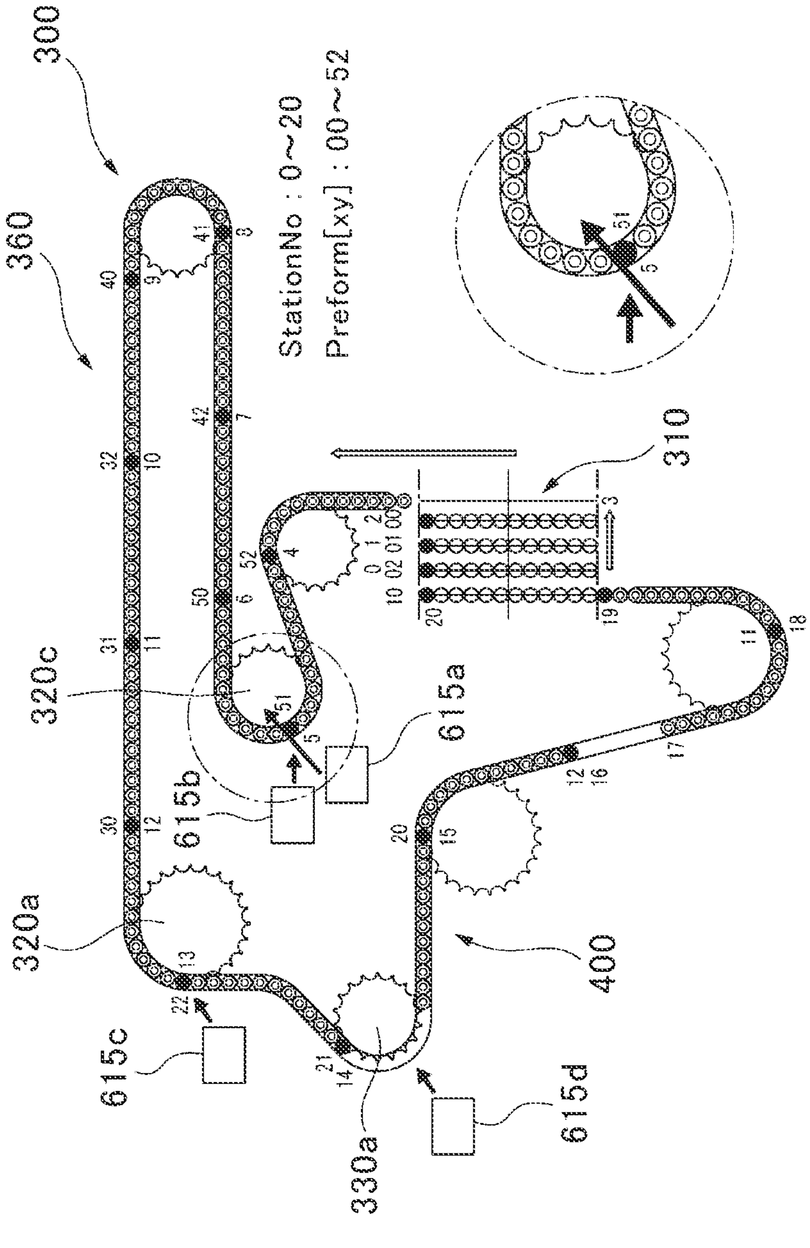
FIG. 5 shows sensors arranged in a conveyance part.

Here, the sensors arranged in the blow molding apparatus 1 will be described with reference to FIG. 5. FIG. 5 shows four sensors 615*a*, 615*b*, 615*c* and 615*d* arranged on the conveyance part 300. Note that, the number of the first conveyance members 310 in one set of the first conveyance members 310 in the conveyance part 300 shown in FIG. 5 is different from those in FIGS. 1 and 3. Note that, in FIG. 5, a position of the leading first conveyance member 310 (or the preform 10) of one set of the first conveyance members 310 is marked with a black circle so as to distinguish the same with the other seven ones other than the leading one.

The sensor 615*a* is configured to detect a posture of the preform 10, specifically, whether the preform 10 is floating from the first conveyance member 310. The sensor 615*b* is configured to detect a temperature of the preform 10 before entering the heating unit 360. The sensor 615*a* and the sensor 615*b* are arranged to detect information (floating and temperature before heating) of the preform 10 at a position near the sprocket 320*c*. The sensor 615*c* is configured to detect a temperature of the preform 10 coming out of the heating unit 360. The sensor 615*c* is arranged to detect information (temperature after heating) of the preform 10 at a position near the sprocket 320*a*. The sensor 615*d* is configured to detect the number of the preforms 10 before being conveyed to the second reversing part 400. The sensor 615*d* is arranged to detect the information (number) of the preform 10 at a position near the sprocket 330*a*.

The information group recording unit 616 is configured to record the information groups acquired by the acquisition unit 614 in the storage 650, in association with the preform groups. The determination unit 618 is configured to determine feasibility of blow molding, based on the information about the molded product state. Specifically, the determination unit 618 determines that blow molding is possible, when the preform 10 has not been molded by the non-usual injection molding, when there is no floating of the preform 10, when the temperature of each preform included in one preform group is within a specified range, and when the number of the preforms exceeds a specified number. The determination result may be recorded in the storage 650. The transfer instruction unit 620 is configured to output, to the second reversing part 300 of the blow molding apparatus 1, an instruction to transfer the preform 10 from the conveyance part 300 to the blow molding part 500 when the determination result output from the determination unit 618 indicates that the blow molding is possible.

The input/output device 700 includes a display unit 710 and an input unit 720. The input unit 720 includes an input device such as a button, a keyboard, and the like for inputting a control instruction to the blow molding apparatus 1. The display unit 710 includes a display device such as a display for outputting operation information about the blow molding apparatus 1. FIG. 6 shows an example of an aspect in which the display unit 710 displays elements relating to an information group of a preform group, and is an example of a screen on which log information at the time of molding using the information management device 600 or the information management method described above can be checked. In FIG. 6, the display unit 710 displays, in a table form, an injection molding cycle number and a blow molding cycle number in the injection molding cycle number ('ID Shot.Row'), a current position of the preform group in the blow molding apparatus 1 ('Station No.'), whether the preform 10 is on the first conveyance member 310 ('Preform exist', OK indicates 'present' and NG indicates 'not present'), a temperature of the preform 10 before heating in the heating unit 360 ('Before reheating'), a posture of the preform ('Floating'), a temperature of the preform 10 after heating in the heating unit 360 ('After reheating'), whether a temperature of the preform 10 is included within the specified range ('Blow temperature', OK indicates 'included' and NG indicates 'not included'), the number of the preforms 10 on the first conveyance member 310 ('Preform counter'), a result of determination as to feasibility of blow molding ('Preform Transfer', OK indicates 'feasible' and NG indicates 'not feasible'), whether the preform 10 has been molded by the non-usual injection molding ('Intermittency preform exist', OK indicate 'usual injection molding' and NG indicates 'non-usual injection molding'), and which of the first reversing pot 212 and the second reversing pot 214 the preform 10 has passed through ('Cooling Block', 0 is the first reversing pot 212 (initial state and upper port) and 1 is the second reversing pot 214). In addition, in FIG. 6, the display unit 710 displays a plan view of the conveyance part 300 below the table, and displays the positions ('Station Nos.') of the preform groups in the plan view. Note that, in FIG. 6, an example is shown in describing the determination that blow molding is impossible. However, actually, a large number of NG determinations as shown in FIG. 6 are not made in a short operation time. Further, FIG. 6 shows an aspect in which each time information is written into information info [x, y] of the preform group [x, y], which will be described later, the written information is displayed, and a blank part is displayed as the step progresses.

Hereinafter, a manufacturing method of a resin container by the blow molding apparatus 1 including the information management device 600 according to the present embodiment will be described. A manufacturing method of a resin container includes a step of injection-molding a preform 10 in the injection molding part 100, a step of conveying the preform 10 molded in the injection molding part 100 to the blow molding part 500, a step of heating the preform 10 while conveying the preform 10 to the blow molding part 500, and a step of blow-molding the conveyed preform 10 into a container 20 in the blow molding part 500.

The step of injection-molding the preform 10 is a step of molding N preforms by injecting molten resin into a space formed by mold clamping the injection core mold 120, the injection neck mold, and the injection cavity mold 130 of the injection molding part 100 (FIG. 2).

The step of conveying the preform 10 molded in the injection molding part 100 to the blow molding part 500 includes a first conveyance step, a first transfer step, a second conveyance step, and a second transfer step. The first conveyance step is a step of taking out the preform 10 from the injection molding part 100 by the take-out device 150 and further transferring the preform from the take-out device 150 to the first reversing part 200 by the preform transfer device 220 (FIG. 2). The first transfer step is a step of reversing the preform from the upright state to the inverted state by the first reversing part 200 and transferring the same to the conveyance part 300 (FIG. 2).

The second conveyance step is a step of conveying the preform 10 to the second reversing part 400 in the conveyance part 300 (FIG. 1). In the second conveyance step, the leading row of one set of the first conveyance members 310 of the parallel driving device 370 are conveyed leftward by the carry-out device, and the preforms 10 are conveyed to the second reversing part 400 via the continuous conveyance region T1 and the intermittent conveyance region T2 (FIGS. 1 and 2).

The second transfer step is a step of reversing the preform 10 from the inverted state to the upright state by the second reversing part 400 and transferring the same to the second conveyance member 530 of the blow molding part 500 (FIG. 2). Here, the second transfer step is performed when it is determined that blow molding is possible by an information management method, which will be described later, and is not performed when it is not determined that blow molding is possible. When the second transfer step is not performed, the untransferred preform 10 on the first conveyance member 310 is removed from the first conveyance member 310 in the sprocket 330*c* (FIG. 2). The first conveyance member 310 on which the preform 10 is not placed is delivered to the parallel driving device 370 by the sprocket 330*c* (FIGS. 1 and 2).

The step of heating the preform 10 is a step of heating the preform 10 during conveyance by the heating unit 360 provided in the continuous conveyance region T1 of the conveyance part 300.

The step of blow-molding the preform 10 into the container 20 is a step of conveying the preform 10 from the preform receiving position B1 to the blow molding position B2 by the second conveyance member 530, mold-clamping the blow cavity mold and the bottom mold, and blowing the air into the preform 10 to mold the container 20. Through these steps, the container 20 is manufactured.

Figure 7:
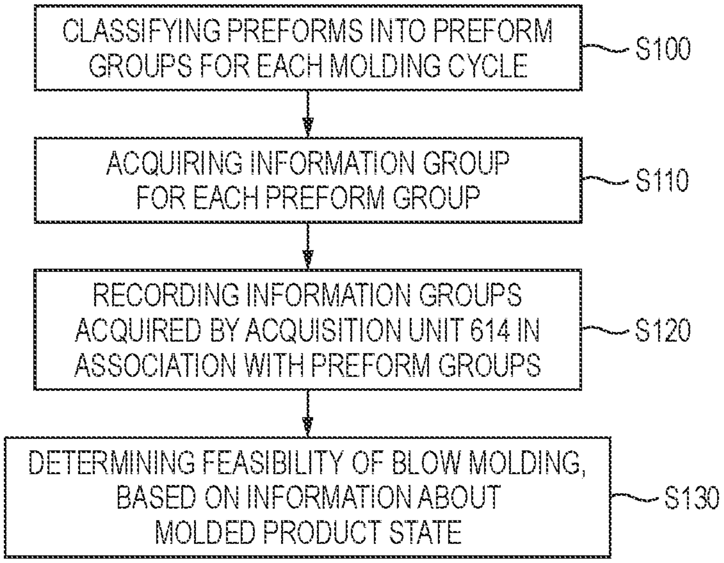
FIG. 7 shows an example of a flow of an information management method.

FIG. 7 shows an example of a flow of an information management method for the preforms 10. As shown in FIG. 7, the information management method for preforms by the information management device 600 of the present embodiment includes a step S100 of classifying, by the classification unit 612, preforms into preform groups for each molding cycle, a step S110 of acquiring, by the acquisition unit 614, an information group for each preform group, a step S120 of recording, by the information group recording unit 616, the information groups acquired by the acquisition unit 614, in association with the preform groups, and a step S130 of determining feasibility of blow molding, based on information about a molded product state (preform group state). The information group and the information about the molded product state are as described above.

Figure 8:
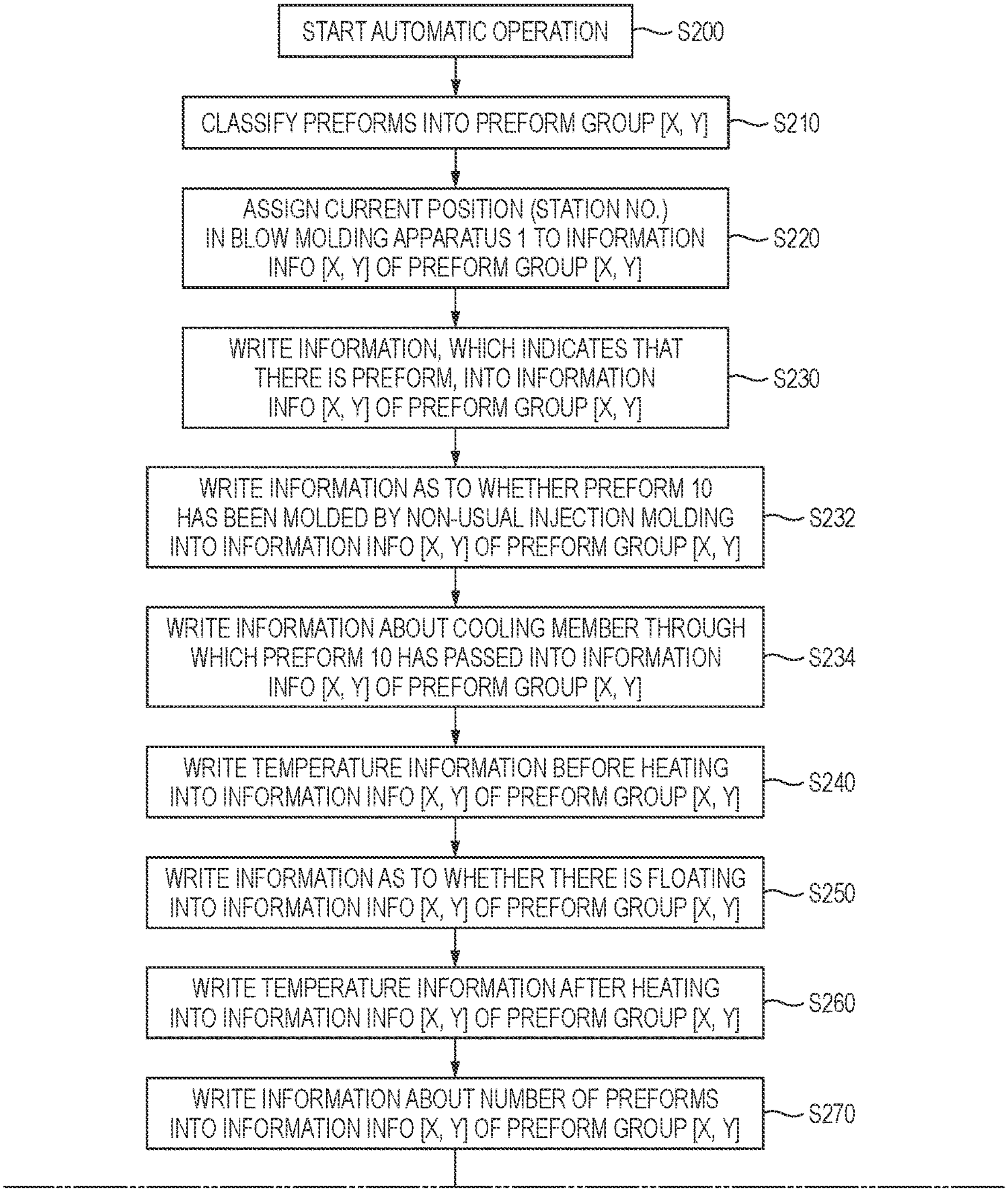
FIG. 8 shows a specific flow of the information management method.

Here, a specific aspect of the information management method for preforms by the information management device 600 of the present embodiment will be described with reference to FIG. 8. FIG. 8 shows a specific flow of the information management method for preforms by the information management device 600 of the present embodiment.

First, when the automatic operation of the blow molding apparatus 1 starts (step S200), the classification unit 612 classifies the preforms into a preform group [x, y], based on a batch number x of injection molding and a row number y in the batch number x (step S210). Next, the classification unit 612 assigns a current position ('Station No.') of the preform group [x, y] in the blow molding apparatus 1 to the information info [x, y] of the classified preform group [x, y]. (Step S220). Note that, the position ('Station No.') in the blow molding apparatus 1 of the information info [x, y] of the preform group [x, y] is rewritten each time the first conveyance member 310 is delivered from the parallel driving device 370.

Next, the acquisition unit 614 and the information group recording unit 616 cooperate to write information, which indicates that a preform exists, into the information info [x, y] of the preform group [x, y] at a timing when the preform group is inserted to the first conveyance member 310, in a state in which the first reversing member 210 holds the preform group of the batch number x (step S230). Note that, when information is written into the information info [x, y], the display unit 710 may be enable to add and display the information in each case (alternatively, in step S290 or step S295, which will be described later, the display unit 710 may be enabled to collectively display the information of the information info [x, y]). At this time, the acquisition unit 614 and the information group recording unit 616 cooperate to write the information, which indicates whether the preform 10 has been molded by the non-usual injection molding, into the information info [x, y] of the preform group [x, y] (step S232). At this time, the information (information about the cooling member through which the preform has passed), which indicates which of the first reversing pot 212 and the second reversing pot 214 the preform 10 has passed through, into the information info [x, y] of the preform group [x, y] (step S234). Note that, the information written in each of steps S230, S232 and S234 may be displayed on the display 710, as the information as to whether the preform 10 is on the first conveyance member 310 ('Preform exist'), as to whether the preform 10 has been molded by the non-usual injection molding ('Intermittency preform exist'), and about which of the first reversing pot 212 and the second reversing pot 214 the preform 10 has passed through ('Cooling Block') (FIG. 6).

Next, the acquisition unit 614 and the information group recording unit 616 cooperate to evaluate the temperatures of the preforms of the preform group [x, y] moving from 'Station No. 5' to 'Station No. 6' by the information output from the sensor 615*b* (FIG. 5), and to write the temperature information before heating into the information info [x, y] of the preform group [x, y] (step S240). The information written in step S240 may be displayed on the display unit 710, as the information about the temperature of the preform 10 before heating in the heating unit 360 ('Before reheating') (FIG. 6).

Next, the acquisition unit 614 and the information group recording unit 616 cooperate to evaluate the preform floating of the preform group [x, y] moving from 'Station No. 5' to 'Station No. 6' by the information output from the sensor 615*a* (FIG. 5), and to write the information as to whether there is floating into the information info [x, y] of the preform group [x, y] (step S250). The information written in step S250 may be displayed on the display unit 710, as the information about the posture of the preform ('Floating') (FIG. 6).

Next, the acquisition unit 614 and the information group recording unit 616 cooperate to evaluate the temperatures of the preforms of the preform group [x, y] moving from 'Station No. 13' to 'Station No. 14' by the information output from the sensor 615*c* (FIG. 5), and to write the temperature information after heating into the information info [x, y] of the preform group [x, y] (step S260). The information written in step S260 may be displayed on the display unit 710, as the information about the temperature of the preform 10 after heating in the heating unit 360 ('After reheating') (FIG. 6). At this time, the determination unit 618 may determine whether the temperature after heating recorded in the information info [x, y] of the preform group [x, y] is included within the specified range, and the information as to whether the temperature of the preform 10 is included within the specified range ('Blow temperature') may be displayed on the display unit 710 (FIG. 6).

Next, the acquisition unit 614 and the information group recording unit 616 cooperate to evaluate the number of the preforms of the preform group [x, y] (the number of the preforms on the first conveyance members 310) moving from 'Station No. 14' to 'Station No. 15' by the information output from the sensor 615*d* (FIG. 5), and to write the information about the number of the preforms into the information info [x, y] of the preform group [x, y] (step S270). The information written in step S270 may be displayed on the display unit 710, as the information about the number of the preforms 10 ('Preform counter') (FIG. 6).

Next, the determination unit 618 determines whether the information, which indicates that there is a preform, the preform has not been molded by the non-usual injection molding, there is no floating of the preform, the temperature of each preform is included within the specified range and the number of the preforms exceeds the specified number, is present in the information info [x, y] of the preform group [x, y] having moved to 'Station No. 15' (step S280). The determination unit 618 outputs a determination result that blow molding is possible, when all information is present (step S280: Yes). In response to the output, the transfer instruction unit 620 outputs a transfer instruction to the second reversing part 400 of the blow molding apparatus 1. By the above processing, the preform group [x, y] is conveyed to the blow molding step (step S290). The determination unit 618 does not output a determination result that blow molding is possible, when the information is not collected (step S280: No). As a result, the preform group [x, y] is discharged out of the machine without being conveyed to the blow molding step (step S295). Through the series of processing, the information about the preforms 10 is managed, and the containers 20 are manufactured. The determination result in step S280 may be displayed on the display unit 710, as the information about a result of determination as to feasibility of blow molding (Preform transfer) (FIG. 6).

For example, in the example shown in FIG. 6, for the preforms in 'ID Shot.Row 4.0 to 4.2' in which 'Preform exist' is indicated as NG and 'Intermittency preform exist' is indicated as NG, a determination result that blow molding is impossible is output. For example, in the example shown in FIG. 6, for the preform in 'ID Shot.Row 2.2' in which 'Floating' is indicated as NG, a determination result that blow molding is impossible is output. For example, in the example shown in FIG. 6, for the preform in 'ID Shot.Row 1.2' in which 'Blow temperature' is indicated as NG, a determination result that blow molding is impossible is output. For example, in the example shown in FIG. 6, for the preform in 'ID Shot.Row 1.2' in which 'Blow temperature' is indicated as NG, a determination result that blow molding is impossible is output (Preform transfer: NG). For example, in the example shown in FIG. 6, for the preform in 'ID Shot.Row 1.1' in which 'Preform counter' is indicated as 11, a determination result that blow molding is impossible is output (Preform transfer: NG).

In the meantime, for example, in the 1.5 step machine, there are a plurality of sites where a plurality of movable parts are simultaneously operated to transfer the molded product to a next step. If the molded product is transferred improperly, malfunction or breakage of the movable part is caused, and the molding apparatus is stopped. In addition, in the 1-1.5 step type molding apparatus, an appropriate molding condition is determined, in consideration of residual heat originating from injection molding and remaining in the molded product. If the molding machine is stopped, the molded products deviate from the proper molding condition, and therefore, the molded products will all become useless and to be destroyed. Further, a degree of wear damage of the movable part that is driven at high speed also increases. If a molded product that is not under suitable molding condition is transferred to a next step, the movable part in the next step operates uselessly, and therefore, the lifetime of the movable part is shortened. In addition, under high-speed molding, it is difficult to set suitable molding conditions in each step, making it difficult to stably manufacture a favorable final molded product. Further, it is difficult to determine which molding conditions have an adverse effect on the molded product. Therefore, there is a need for improvements so that a mechanical operation and a molding process of the molding apparatus can be stabilized even under high-speed molding.

According to the information management method of the present embodiment described above, the preforms 10 are classified for each injection molding cycle, and the information about the preforms 10 is recorded in association with the classified preform groups, so that it is possible to optimize the machine operation of the blow molding apparatus 1 and to determine whether the molding conditions are proper. As a result, it is possible to improve stability of a mechanical operation and a molding process of the blow molding apparatus 1. In particular, the above information management method is useful for a 1.5-step type blow molding apparatus with a large number of simultaneous molding preforms or transfer units.

In addition, the information group including at least the information about the current position of the preform group in the blow molding apparatus 1 and the molded product state is recorded and managed in association with each preform group, so that the information about the preform 10 that is conveyed in the blow molding apparatus 1 can be perceived. Further, when the information group including at least the information about the injection molding cycle number, the blow molding cycle number in the injection molding cycle number, the current position of the preform group in the blow molding apparatus 1, and the molded product state is recorded and managed in association with each preform group, the information about the preform 10 that is conveyed in the blow molding apparatus 1 can be perceived in more detail. In addition, the information group is displayed on the display unit 710, so that the information about the preform 10 that is conveyed in the blow molding apparatus can be visualized.

Further, the information about the molded product state, which includes at least the information as to whether the preform 10 is on the first conveyance member 310, about the temperature of the preform 10 before heating in the heating unit 360, about the temperature of the preform 10 after heating in the heating unit 360, about the posture of the preform 10 and about the number of the preforms 10, is recorded and managed in association with each preform group, so that the information about the preform 10 that is conveyed in the blow molding apparatus 1 can be perceived more specifically.

Further, the feasibility of blow molding is comprehensively determined from the factors such as whether the preform 10 is on the first conveyance member 310, the temperature of the preform 10 after heating (after temperature adjustment), the posture of the preform 10 and the number of the preforms 10, and the preform 10 having appropriate blow molding conditions is transferred to the blow molding part 500, so that unnecessary operations of the movable parts (reversing part, blow conveyance part, etc.) of the blow molding part 500 can be reduced and the lifetime of the components can be extended. Furthermore, since unnecessary blow molding is not performed, energy saving can also be achieved.

Note that, the present invention is not limited to the above embodiment and can be freely modified and improved as appropriate. In addition, the material, shape, dimension, numerical value, form, number, arrangement location, and the like of each constitutional element in the above embodiment are arbitrary and are not particularly limited as long as the present invention can be achieved.

For example, in the embodiment described above, the aspect in which various functional units are implemented in the processor of one device has been described. However, various functional units may be distributed and implemented in processors of a plurality of devices via a local network or the Internet. In addition, in the embodiment described above, the display unit 710 and the input unit 720 have been described as separate aspects, but may be configured as one functional unit by a touch panel or the like with which an input and a display can be made.

In addition, the blow molding apparatus 1 in which the information management method for a resin molded product of the present disclosure is implemented may also be a hot parison-type (1 stage-type) apparatus in which a preform is intermittently conveyed to each molding station every predetermined angle (formed body, 120° or 90°) by a rotary plate. In this case, the first conveyance member 310 becomes a neck mold, and the conveyance part 300 becomes a rotary plate to which the neck mold is fixed.

The present application is based on the Japanese Patent Application (Patent Application No. 2020-123155) filed on Jul. 17, 2020, the entirety of which is incorporated by reference. Also, all references cited herein are incorporated in their entirety.

REFERENCE SIGNS LIST

1: blow molding apparatus, 10: preform, 20: container, 100: injection molding part, 200: first reversing part, 300: conveyance part, 310: first conveyance member, 360: heating unit, 400: second reversing part, 500: blow molding part, 600: information management device, 612: classification unit, 614: acquisition unit, 616: information group recording unit, 618: determination unit, 700: input/output device

The invention claimed is:

1. An information management device for a resin molded product in a molding apparatus configured to intermittently manufacture resin molded products, the information management device comprising:

a processor configured to:

classify the resin molded products into molded product groups for each molding cycle;

acquire an information group for each molded product group;

record the information groups acquired, in association with the molded product groups; and determine feasibility of blow molding, based on information about a molded product state, wherein the information about the molded product state comprises information about at least a posture of each of the preforms and information about a number of the preforms, the processor is further configured to determine the feasibility of blow molding based on at least the posture of each of the preforms and the number of the preforms, each information group includes information about a current position of the molded product group within the molding apparatus, and the processor is further configured to:

display a display screen including a table showing the information groups of the respective molded product groups, and a plan view of the molding apparatus; and update the table each time the information included in the information groups is acquired.

2. The information management device for the resin molded product according to claim 1, wherein the molding apparatus is a blow molding apparatus comprising an injection molding part configured to injection-mold a bottomed resin preform, and a blow molding part configured to manufacturing a resin container by blow-molding the preform molded in the injection molding part, and wherein the information group further comprises at least information about the molded product state.

3. The information management device for the resin molded product according to claim 2, wherein the processor is further configured to classify preforms molded in the injection molding part into molded product groups for each injection molding cycle and for each blow molding cycle among preforms molded in one injection molding cycle, and wherein the information group comprises at least information about an injection molding cycle number, a blow molding cycle number in the injection molding cycle number, a current position of the preform group in the blow molding apparatus, and the molded product state.

4. The information management device for the resin molded product according to claim 3, wherein the blow molding apparatus comprises a conveyance member configured to convey the preforms from the injection molding part to the blow molding part, and a heater configured to heat the preforms while conveying the preforms to the blow molding part, wherein the information about the molded product state comprises at least information as to whether each of the preforms is on the conveyance member, as to whether each of the preforms has been molded by non-usual injection molding for partially maintaining an operating state of the blow molding apparatus, about a cooling member through which each of the preform has passed, about a temperature of each of the preforms before heating in the heater, and about a temperature of each of the preforms after heating in the heater, and wherein the temperature of each of the preforms before heating in the heater, the temperature of each of the preforms after heating in the heater, the posture of each of the preforms and the number of the preforms are an information group that is detected by sensors arranged in the blow molding apparatus.

5. A blow molding apparatus comprising:

an injection molding part configured to injection-mold a bottomed resin preform;

a blow molding part configured to manufacturing a resin container by blow-molding the preform molded in the injection molding part;

a conveyance member configured to convey the preform from the injection molding part to the blow molding part;

a heater configured to heat the preform while conveying the preform to the blow molding part; and the information management device for the resin molded product according to claim 4, wherein when a result of the determination of the processor of the information management device as to feasibility of blow molding indicates that the blow molding is possible, the preform is transferred from the conveyance member to the blow molding part and a resin container is blow-molded.

6. The blow molding apparatus according to claim 5, further comprising a display configured to be able to display elements relating to the information group.

* * * * *